US006849289B2

(12) United States Patent
Lefebvre et al.

(10) Patent No.: US 6,849,289 B2
(45) Date of Patent: Feb. 1, 2005

(54) EFFERVESCENT CARAMEL PRODUCT

(75) Inventors: Olivier Lefebvre, Dijon (FR); Alexis Mikael Paul Lecat, Forel-Lavaux (CH)

(73) Assignee: Nestec S.A., Vevey (CH)

( * ) Notice: Subject to any disclaimer, the term of this patent is extended or adjusted under 35 U.S.C. 154(b) by 254 days.

(21) Appl. No.: 10/236,893

(22) Filed: Sep. 5, 2002

(65) Prior Publication Data
US 2003/0039736 A1 Feb. 27, 2003

Related U.S. Application Data

(63) Continuation of application No. PCT/EP01/00620, filed on Jan. 19, 2001.

(30) Foreign Application Priority Data

Mar. 6, 2000 (GB) .............................. 0005348

(51) Int. Cl.$^7$ ................................. A23G 3/00
(52) U.S. Cl. ........................ 426/660; 426/533
(58) Field of Search ................ 426/660, 533

(56) References Cited

U.S. PATENT DOCUMENTS

| 3,012,893 | A | * | 12/1961 | Kremzner et al. | 426/572 |
|---|---|---|---|---|---|
| 3,660,107 | A | | 5/1972 | Mayer | 99/66 |
| 3,677,770 | A | * | 7/1972 | Witzel | 426/548 |
| 3,985,910 | A | * | 10/1976 | Kirkpatrick | 426/572 |
| 4,127,645 | A | | 11/1978 | Witzel et al. | 424/44 |
| 4,269,860 | A | | 5/1981 | Ogawa et al. | 426/5 |
| 4,275,083 | A | * | 6/1981 | Colten et al. | 426/96 |
| 4,289,790 | A | | 9/1981 | Bruelle | 426/93 |
| 4,317,839 | A | * | 3/1982 | Mitchell et al. | 426/96 |
| 4,358,469 | A | * | 11/1982 | Lavie | 426/250 |
| 4,582,709 | A | * | 4/1986 | Peters et al. | 426/74 |
| 4,876,802 | A | | 10/1989 | Gergely et al. | 34/15 |
| 4,911,930 | A | | 3/1990 | Gergely et al. | 34/15 |
| 5,085,876 | A | * | 2/1992 | Tsau | 426/92 |
| 5,279,842 | A | | 1/1994 | Escola Gallart et al. | 426/282 |
| 5,384,148 | A | * | 1/1995 | Lynch et al. | 426/632 |
| 5,985,341 | A | * | 11/1999 | Ahlschwede | 426/93 |
| 6,479,085 | B1 | * | 11/2002 | Archibald | 426/103 |
| 6,673,380 | B2 | * | 1/2004 | Yang et al. | 426/72 |
| 6,740,350 | B2 | * | 5/2004 | Pfeiffer | 426/572 |

FOREIGN PATENT DOCUMENTS

| CN | 1199559 | 4/1999 |
|---|---|---|
| DE | 247 376 A4 | 7/1987 |
| EP | 0 437 927 A2 | 7/1991 |
| EP | 0 776 609 A1 | 6/1997 |
| FR | 2 508 280 | 12/1982 |
| GB | 1033337 | 6/1966 |
| GB | 1 215 449 | 12/1970 |
| GB | 2 163 636 A | 3/1986 |
| JP | 74004377 | 1/1994 |
| JP | 74904377 B | 1/1994 |

* cited by examiner

Primary Examiner—N. Bhat
(74) Attorney, Agent, or Firm—Winston & Strawn LLP

(57) ABSTRACT

An effervescent caramel product having an aerated texture and producing effervescence in contact with saliva in mouth comprising a caramel having a water activity of from about 0.2 to 0.5 blended with a mixture of a water-soluble organic acid and a carbonate or bicarbonate capable of reacting to liberate carbon dioxide.

19 Claims, 1 Drawing Sheet

EFFERVESCENT CARAMEL PRODUCT

CROSS-REFERENCE TO RELATED APPLICATION

The present application is a continuation of the US national stage designation of International Application PCT/EP01/00620 filed Jan. 19, 2001, the content of which is expressly incorporated herein by reference thereto.

TECHNICAL FIELD

The present invention relates to an effervescent caramel product and a process for its manufacture.

BACKGROUND OF THE INVENTION

JP 74004377 B describes caramel sweets that release carbon dioxide bubbles upon contact with saliva. Confectionaries with a very fresh taste are obtained by (1) mixing solid powdered acids (e.g. citric, tartaric) with water or ethanol; (2) drying and pulverizing; (3) mixing a solid carbonate (e.g. $NaHCO_3$) with water and binder; (4) mixing the acid and carbonate powders; (5) passing through a double-axle roller to form half-dry thin sheets, and damping with ethanol; (6) coating with diluent salts and forming into a foamed powder using a pneumatic pulverizer, (7) mixing sugar, millet jelly, condensed milk, wheat flour, milk, etc. and boiling down to a caramel; (8) adding the powder obtained in step (6) to the caramel at 37–45° C.; and (9) cooling to obtain the product. In this process, a standard caramel is used having a water activity (aw) of about 0.7, i.e., it contains a high free water content. Since the effervescent powder is highly reactive with free water, it must be protected by encapsulation with diluent salts to give the foamed powder that is added to the caramel. If the effervescent powder were not protected, it would react with the free water present in the caramel over time, e.g. during storage and its effervescent effect would be reduced or lost before it reached the consumer.

Thus, there is a need for improved effervescent carmel products and these are now provided by the present invention.

SUMMARY OF THE INVENTION

We have found that by using a caramel having a water activity (aw) of about 0.2 to 0.5, thus having a reduced free water content, the effervescent powder can be used without encapsulation and the product has a long shelf life without substantial loss of the effervescent effect. In this invention, the word "effervescent" is meant to include "fizzy" or "releasing carbon dioxide bubbles" or other similar effects.

Accordingly, the present invention now provides an effervescent caramel product having an aerated texture and producing effervescence in contact with saliva in mouth comprising a caramel having a water activity of from about 0.2 to 0.5 blended with a mixture comprising a water-soluble organic acid and a carbonate or bicarbonate capable of reacting to liberate carbon dioxide.

Preferably, the mixture is in the form of a dry, unencapsulated powder that is blended with the caramel, the organic acid is citric acid or tartaric acid and the base is sodium bicarbonate. The mixture is present in an amount of from 2 to 20% by weight based on the total weight of the effervescent caramel product. If desired, the mixture can contain from 2 to 25% by weight of a hydrogenated fat based on the weight of the powder mixture and fat.

The invention also relates to a process for preparing an effervescent caramel product which comprises selecting a carmel having a low water activity of from about 0.2 to 0.5; and blending the caramel with a mixture comprising an organic acid and a solid carbonate or bicarbonate base for a sufficient time to distribute the mixture in the carmel and form the effervescent caramel product. Advantageously, pieces of caramel of the appropriate size can be blended with a dry, powdered mixture that is not encapsulated in a dough mixer to form a paste, cooling and layering the paste to a desired thickness and cutting the paste thickness to form effervescent carmel products of desired dimensions.

The present invention further provides a process for preparing an effervescent powdered mixture which comprises feeding the ingredients of an organic acid and a solid carbonate or bicarbonate base to an apparatus comprising a vessel which rotates the ingredients about an axis while simultaneously granulating the rotating ingredients with rotating blades, with the speed of rotation of the ingredients and of the blades being chosen to obtain a powder of the desired particle size. This powder mixture can then be blended with carmel to form effervescent carmel products.

BRIEF DESCRIPTION OF THE DRAWINGS

The preparation of the effervescent powder used in this invention will now be described, by way of example only, with reference to the drawing in which.

DETAILED DESCRIPTION OF THE PREFERRED EMBODIMENTS

Figure 1:
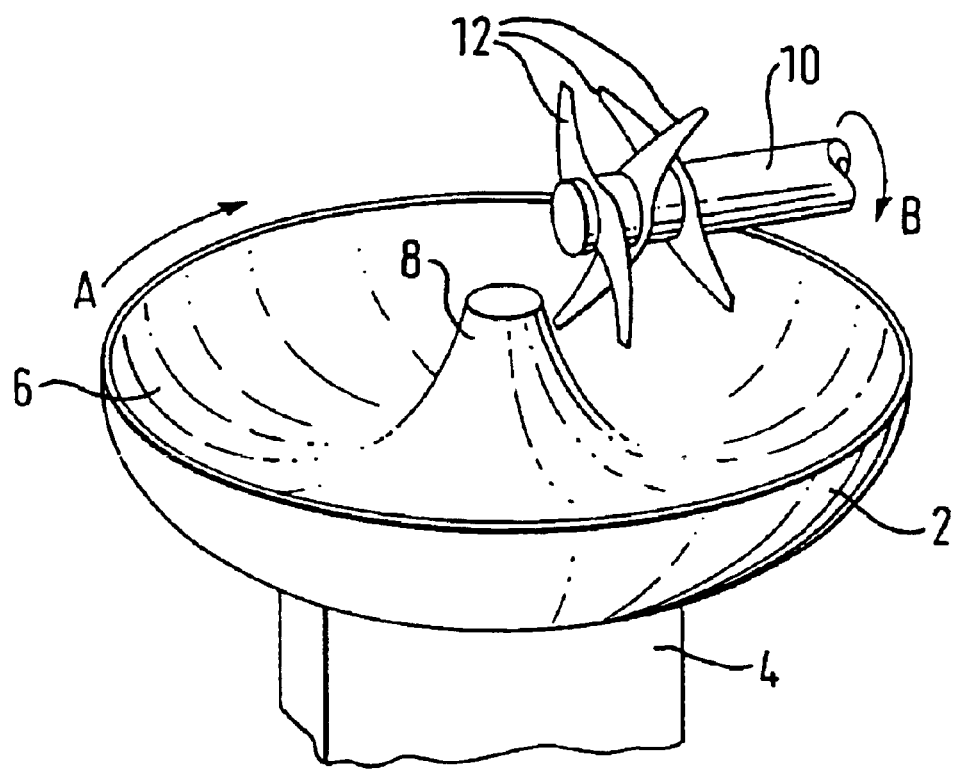
FIG. 1 is a perspective, partial view of an apparatus for carrying out the process.
Figure 2:
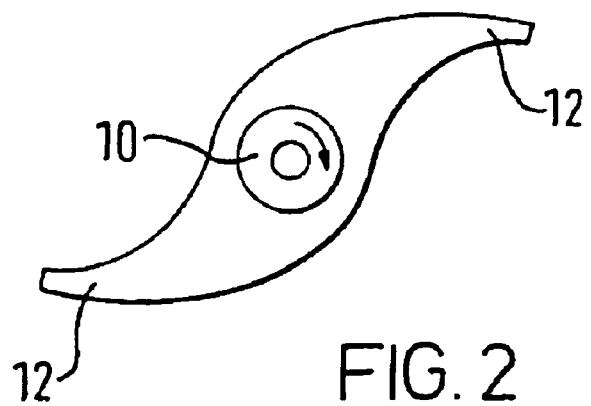
FIG. 2 is a transverse section through the blade shaft to show a pair of blades.

Caramels comprise as basic ingredients, sugar, glucose syrup, milk protein, fat salt and water. The term caramel may include toffee and formulations are well known to those skilled in the art and are described, for example, in Sugar Confectionery Manufacture, Second Edition, 1995, edited by E. B. Jackson, Blackie Academic and Professional, Chapter 8 and page 289. The water activity of the caramel is between 0.2 and 0.5 and preferably is from 0.3 to 0.4. For clarity, it should be understood that the term "caramel" excludes products made by the breakdown of carbohydrate by heat or heat and alkali treatment, which products are predominantly used as coloring materials.

The mixture comprising an organic acid and a solid carbonate or bicarbonate base capable of reacting to liberate carbon dioxide is preferably in the form of a powder when it is blended with the caramel. The ratio of acid to base should be chosen to provide a mixture which is capable of effervescing and is preferably about 50:50. Preferred organic acids are citric acid and tartaric acid. The preferred base is sodium bicarbonate. The mixture advantageously contains from 2 to 25% by weight and preferably from 5 to 20% by weight of a hydrogenated fat based on the weight of the mixture. Examples of hydrogenated fats include commercially available fats such as Biscuitine N from Loders-Crooklaan and Confao 12 form Aahrus Olie. Hydrogenated fats may be prepared by a process well-known in the oil and fat industry using hydrogen under pressure to modify the molecular structure of the fat to obtain various advantages such as lower melting point, better mouthfeel etc.

The amount of the mixture comprising an organic acid and a solid carbonate or bicarbonate base blended with the caramel may be from 2 to 25% by weight and preferably from 5 to 20% by weight based on the total weight of the effervescent caramel product.

The caramel may be blended with the mixture comprising an organic acid and a solid carbonate or bicarbonate base by mixing methods known to those skilled in the art, e.g., by mixing pieces of caramel of the appropriate size with the powdered mixture comprising an organic acid and a solid carbonate or bicarbonate base in a dough mixer to form a paste, cooling and layering to the required thickness and cutting to the required dimensions, e.g., using a dough cutter.

The effervescent powdered mixture comprising an organic acid and a solid carbonate or bicarbonate base may be manufactured by any method standard to a person skilled in the art but preferably by a novel method using an apparatus which rotates the ingredients while simultaneously granulating the rotating ingredients with rotating blades.

A suitable vessel is a bowl cutter (also known as a bowl chopper) which is a well known machine developed for and supplied to the meat industry.

Conveniently, the fatty acid and the base are added to the vessel and blended by the mixing action of the vessel and heated to from 55 to 70° C., preferably from 60 to 65° C. The hydrogenated fat is melted and added, e.g. by spraying or pouring onto the dry blend in the vessel, to the heated blend in the vessel and dispersed in the dry blend by the mixing action of the vessel. The mixture of organic acid, base and hydrogenated fat is then cooled, e.g., to about 20 to 40° C. The powder is conveniently added at room temperature to the caramel.

In this invention, during the contacting with the rotating blades, the ingredients may be mixed, the particle size of the ingredients may be reduced by grinding and particles, which may or may not have been previously ground, may be granulated to form agglomerates.

Conveniently, the ingredients are rotated about a first axis and the blades are rotated about a second axis in a different plane to the first axis, for instance perpendicular to the first axis. Preferably, the first axis is vertical as that that the ingredients are rotated substantially horizontally and the blades are rotated about a horizontal axis.

The vessel may be rotated at any suitable speed. It will be appreciated that speeds which are too low may not give adequate performance within acceptable times while speeds which are too high would provide no real benefit for the additional energy consumption. Also, optimum speeds may vary depending upon the nature of the ingredients, the amount of ingredients, and other process parameters. However a speed of 2 to 30 rpm would generally be acceptable. For example the speed may be about 5 to 25 rpm; particularly about 10 to 20 rpm.

The blades may be rotated at any suitable speed to achieve adequate granulation of the ingredients. Optimum speeds will vary depending upon the nature of the ingredients, the amount of ingredients, the number of blades, and other processing parameters. However the optimum speed can be readily determined by the person skilled in the art for any particular application. It will be appreciated that speeds which are too low will not give adequate granulation within acceptable times. Speeds which are too high, however, would unnecessarily consume energy for little benefit and would also make control of the process more difficult. The speeds may also vary with time to adjust to the different ingredients as they are added. For example, speeds in the range of 20 rpm to 10,000 rpm may be used, and preferably from 2000 rpm to 5000 rpm.

The number of blades used may also be selected as desired e.g., from 1 to 8 blades. However the use of too few blades may not give sufficiently high granulating rates. Too many blades on the other hand may cause the ingredients mixture to stick in between adjacent blades. When an even number of blades is used, the blades may be arranged in pairs, each pair fitted on a central axis of rotation 2 to 8 blades and preferably 4 to 6 blades are found to be acceptable for most applications; especially 6 blades arranged in three pairs of two blades. Of course, in very large scale operations, more blades may be used.

The vessel for rotating and granulating of the ingredients may have a capacity of from about 10 to 1000 liters. As stated above, a suitable apparatus is a bowl cutter and commercial bowl cutters usually have capacities from about 50 to 750 liters or more.

Typically, a bowl cutter consists of a half-toroid shaped bowl capable of revolving slowly around vertical axis e.g., from 5 to 30 rpm and typically from 10 to 20 rpm, in which a set of three rotary knife blades revolve about a horizontal axis extending radially inward from the circumference of the bowl. A steel lid lowers over the back half of the bowl, enclosing the blades to form a cutting chamber. As the bowl rotates, the material in the bowl is continuously transported through the cutting chamber a set number of times as determined by the number of bowl revolutions. The intensity of granulating/mixing is determined by the speed of knife rotation. Since this is variable over a large range (0–6500 rpm), the bowl cutter has an extremely versatile capability. On a machine having a capacity of 60 liters there were 6 knives of 350 mm diameter, giving a tip-speed of 120 m/sec. at 6500 rpm. For a machine having a capacity of 200 liters, a tip-speed of 120 m/sec. was obtained at 4150 rpm. The construction is of stainless steel, and is hose- and waterproof for wet cleaning.

The apparatus consists of a mixing bowl 2 which is arranged to be upwardly open. The bottom surface of the bowl 2 is connected by a shaft (not shown) to a suitable drive mechanism 4 which is able to rotate the bowl 2 in the direction of arrow A about a vertical axis. The drive mechanism 4 may include a speed adjustment system by means of which the speed of rotation of the bowl 2 may be set to a desired value.

In the hollow 6 of the bowl 2, a central projection 8 extends upwardly from the bottom of the bowl 2 along the axis of rotation of the bowl 2. The central projection 8 curves outwardly with increasing depth into the hollow 6 of the bowl 2. The central projection 8 ensures that the ingredients in the bowl 2 rotate with the bowl 2 rather than falling into the center of the bowl 2.

A blade shaft 10 extends radially inwardly over the opening of the bowl 2, from the circumference of the bowl 2 to just short of the central projection 8. The axis of rotation of the blade shaft 10 is vertical and perpendicular to the axis of rotation of the bowl 2. The blade shaft 10 is connected to a suitable drive mechanism (not shown) to rotate the blade shaft 10 in the direction of arrow B. The drive mechanism includes a speed adjustment system (not shown) by means of which the speed of rotation of the blade shaft 10 may be set to a desired value.

Three pairs of cutting blades 12 are fixed onto the blade shaft 10 with each blade 12 at an angle of 60° to each adjacent pair of blades 12. The blades 12 are of length so that, at their deepest projection into the bowl 2, they almost reach the bottom of the bowl 2.

The bowl 2 has a suitable covering (not shown) to prevent the ingredients from being expelled from the bowl 2 during processing.

The apparatus is commercially available and suitable examples are the SEYDELMANN series of mixer/cutters obtainable from Maschinen fabrik Seydelmann KG, D-7000 Stuttgart, Germany.

EXAMPLES

The following examples further illustrate the present invention. Parts and percentages are given by weight unless otherwise indicated.

Example 1

An effervescent powder is prepared in the following manner:
1. Blend 900 parts sodium bicarbonate and 900 parts citric acid together in a bowl cutter.
2. Heat up the blend in the bowl cutter up to 63° C.
3. Melt 200 parts hydrogenated fat up to 75° C. while the dry blend is being heated
4. Spray or pour the fat onto the dry blend in the bowl cutter. The fat is dispersed using the mixing action of the bowl cutter
5. Cool the mixture to 34° C. to obtain the effervescent powder.

This powder can be added to carmel to form effervescent carmel products.

Example 2

A caramel is prepared from the following ingredients by the method indicated:

| component | % |
|---|---|
| Invert syrup 74% TS | 15.8 |
| Sweetened Skimmed Condensed Milk | 8.4 |
| Fat (eg. CBE (Illexao 30/69)) | 10.8 |
| Glucose syrup 63 DE | 61.8 |
| Glycerol | 2.4 |
| Salt | 0.8 |
| Total | 100.00 |
| Yield | 82.00 |

1. Melt the CBE fat
2. Add CBE fat to all other ingredients
3. Pour into a BCH pan manufactured by BCH which is a steam heated vessel with a strong mixing mechanism that helps to mix and heat a product at the same time and mix at speed 12.
4. Switch ventilation on and cook up to 128° C.
5. When 128° C. is reached turn the steam off and pour the caramel into a bucket
6. Spread the caramel on a cold metal table and leave to cool The effervescent product is prepared from the effervescent powder of Example 1 and the caramel prepared above as follows:
1. Cut the caramel into pieces of 8 to 10 centimeters
2. Put into the dough mixer (Z-arm mixer) with the effervescent powder and start at slow speed
3. Leave to mix
4. When the mix becomes a smooth, golden paste state with no traces of the powder left, stop and take the caramel out of the mixer.
5. Put it on a table and layer it to the required thickness between two metal slats and with a metal pin
6. Using a dough cutter, cut out pieces of the fizzy caramel to the required dimensions.

The resulting product has an effervescent effect in the mouth when eaten due to the reaction of the acid and base.

What is claimed is:

1. An effervescent caramel product having an aerated texture and producing effervescence in contact with saliva in mouth comprising a caramel having a low water activity of from about 0.2 to 0.5 blended with a mixture comprising a water-soluble organic acid and a carbonate or bicarbonate capable of reacting to liberate carbon dioxide.

2. An effervescent caramel product according to claim 1 wherein the mixture is in the form of a dry, unencapsulated powder that is blended with the caramel.

3. An effervescent caramel product according to claim 1 wherein the organic acid is citric acid or tartaric acid and the base is sodium bicarbonate.

4. An effervescent caramel product according to claim 1 wherein the mixture contains from 2 to 25% by weight of a hydrogenated fat based on the weight of the powder mixture and fat.

5. An effervescent caramel product according to claim 1 wherein the amount of the mixture is present in an amount of from 2 to 20% by weight based on the total weight of the effervescent caramel product.

6. A process for preparing an effervescent caramel product which comprises selecting a carmel having a low water activity of from about 0.2 to 0.5; and blending the caramel with a mixture comprising an organic acid and a solid carbonate or bicarbonate base for a sufficient time to distribute the mixture in the carmel and form the effervescent caramel product.

7. A process according to claim 6 which comprises mixing pieces of caramel of the appropriate size with a dry, powdered mixture that is not encapsulated in a dough mixer to form a paste, cooling and layering the paste to a desired thickness and cutting the paste thickness to form carmel products of desired dimensions.

8. A process according to claim 6 wherein the organic acid is citric acid or tartaric acid and the base is sodium bicarbonate.

9. A process according to claim 6 wherein the mixture contains from 2 to 20% by weight of a hydrogenated fat based on the weight of the effervescent caramel product.

10. A process according to claim 6 wherein the amount of the mixture is present in an amount of from 2 to 20% by weight based on the total weight of the effervescent caramel product.

11. A process for preparing an effervescent powdered mixture which comprises feeding the ingredients of an organic acid and a solid carbonate or bicarbonate base to an apparatus comprising a vessel which rotates the ingredients about an axis while simultaneously granulating the rotating ingredients with rotating blades, with the speed of rotation of the ingredients and of the blades being chosen to obtain a powder mixture of the desired particle size.

12. A process according to claim 11 wherein the vessel is a bowl cutter.

13. A process according to claim 11 wherein the organic acid and the base are first added to the vessel and blended by the mixing action of the vessel and then heated to 55 to 70° C., a hydrogenated fat is melted and added to the heated dry blend in the vessel, and is dispersed in the dry blend by the mixing action of the vessel, after which the mixture of organic acid, base and hydrogenated fat is then cooled.

14. A process for preparing an effervescent caramel product which comprises selecting a carmel having a low water activity of from about 0.2 to 0.5; blending the caramel with the powder mixture of claim 11 for a sufficient time to distribute the mixture in the carmel and form the product.

15. A process according to claim 14 which comprises mixing pieces of caramel of the appropriate size with the powdered mixture in a dough mixer to form a paste, cooling and layering the paste to a desired thickness and cutting the paste thickness to form effervescent carmel products of desired dimensions.

16. A process according to claim 14 wherein the organic acid is citric acid or tartaric acid and the base is sodium bicarbonate in the powder mixture.

17. A process according to claim 14 wherein a hydrogenated fat is melted and added to the powder mixture and then cooled prior to mixing with the carmel.

18. A process according to claim 17 wherein the mixture contains from 2 to 25% by weight of the hydrogenated fat based on the weight of the powder mixture and fat.

19. A process according to claim 14 wherein the amount of the powder mixture is present in an amount of from 2 to 20% by weight based on the total weight of the effervescent caramel product.

* * * * *

UNITED STATES PATENT AND TRADEMARK OFFICE
CERTIFICATE OF CORRECTION

PATENT NO. : 6,849,289 B2
DATED : February 1, 2005
INVENTOR(S) : Lefebvre et al.

It is certified that error appears in the above-identified patent and that said Letters Patent is hereby corrected as shown below:

Column 1,
Line 38, delete "carmel" and insert -- caramel --.

Column 2,
Lines 1, 4, 10 and 20, (each occurrences) delete "carmel" and insert -- caramel --.

Column 5,
Lines 24 and 25, delete "carmel" and insert -- caramel --.

Column 6,
Lines 24, 28, 34, 64 and 67, delete "carmel" and insert -- caramel --.

Column 7,
Lines 5 and 12, delete "carmel" and insert -- caramel --.

Signed and Sealed this

Twenty-fourth Day of May, 2005

JON W. DUDAS
*Director of the United States Patent and Trademark Office*